United States Patent [19]

Popp et al.

[11] Patent Number: 5,321,922
[45] Date of Patent: Jun. 21, 1994

[54] STEEL CABLE EYELET CONSTRUCTION FOR A LOOPED STEEL CABLE END

[75] Inventors: Xaver Popp, Loemmenschwil; Theo Loepfe, Haeggenschwil, both of Switzerland

[73] Assignee: Fatzer AG, Romanshorn, Switzerland

[21] Appl. No.: 14,651

[22] Filed: Feb. 8, 1993

[30] Foreign Application Priority Data

Feb. 18, 1992 [CH] Switzerland ............. 00484/92

[51] Int. Cl.⁵ ............................................. E02D 5/74
[52] U.S. Cl. ........................................ 52/155; 52/147; 52/166; 405/259.1; 405/302.2
[58] Field of Search ............... 405/302.2, 259.1; 294/74; 52/155, 147, 151, 156, 166

[56] References Cited

U.S. PATENT DOCUMENTS

| | | | |
|---|---|---|---|
| 1,954,642 | 4/1934 | Matthews | 52/147 |
| 3,122,806 | 3/1964 | Lewis . | |
| 3,142,365 | 7/1964 | Price | 52/147 |
| 3,310,333 | 3/1967 | Hutson . | |
| 3,472,120 | 10/1969 | Taylor | 405/302.2 X |
| 4,456,405 | 6/1984 | Galis | 405/302.2 X |
| 4,597,351 | 7/1986 | Brainard | 294/74 X |
| 4,760,991 | 8/1988 | Asai . | |
| 4,767,241 | 8/1988 | McLaren | 405/302.2 |
| 5,018,775 | 5/1991 | McKenna et al. | 294/74 |

FOREIGN PATENT DOCUMENTS 672934 1/1990 Switzerland .
574236 12/1946 United Kingdom .

*Primary Examiner*—Dennis L. Taylor
*Attorney, Agent, or Firm*—W. G. Fasse; W. F. Fasse

[57] ABSTRACT

A steel cable eyelet construction for a looped steel cable end is protected against corrosion by a tubular member of synthetic material that extends all the way around the loop and partially into the ground when the steel cable end is formed as an anchor that is cemented into the ground. The synthetic material tubular member in turn is protected against mechanical wear and tear by a tubular metal jacket such as a stainless steel jacket. This construction is especially suitable for anchors that are used to secure protection nettings against falling rocks and avalanches. Providing the corrosion protection and the mechanical wear and tear resistance by different elements assures a prolonged serviceability of such steel cable eyelets forming anchors cemented into the ground.

6 Claims, 1 Drawing Sheet

STEEL CABLE EYELET CONSTRUCTION FOR A LOOPED STEEL CABLE END

FIELD OF THE INVENTION

The invention relates to a steel cable eyelet construction for a looped steel cable end that is used particularly for anchoring protection systems against falling rocks and avalanches. The protection systems comprise netting that is secured to the cable eyelets and the cable itself is secured to the ground, for example, by cementing into a bore in rock.

BACKGROUND INFORMATION

Anchoring devices of the above type are known and constructed so that one end thereof is secured in the ground, for example, in a hole drilled into a rock and then secured therein by cementing. The portion of the anchor extending out of the ground is provided with the eyelete that in turn is connected to the protection netting made, for example, of steel wires or cables or the like. Such netting provides protection against falling rocks or avalanches or the like.

Conventional anchors of this type are exposed to long term corrosion which poses a substantial problem with regard to the strength of such anchoring devices, especially since such anchoring devices are expected to remain functional for many years, even decades under all weather conditions.

Conventionally, corrosion protection is provided by using galvanized steel wires for forming the steel cables that are part of the anchoring device. However, galvanized wires have not been satisfactory, because the movements to which these anchors are exposed during service cause the removal or damage of the galvanized surface. Such movements occur when the effective forces change directions, for example, under the influence of a snow load or when temperature variations cause a lengthening or shrinking in the netting. As a result, the anchor, especially its eyelet is also exposed to motions which adversely affect the anchor's ability to resist corrosion. This adverse influence is especially effective on that portion of the anchor that extends out of the ground and is exposed to the effects of alternating loads. Additionally, the area of the steel cable close to the ground is particularly exposed to corrosion advancing influences, such as oxygen in the air close to the ground, moisture and water in the ground, heat influences and acidic soil or rock characteristics. These influences eventually cause corrosion damage of the individual wires in the cable, thereby reducing their strength individually and of the cable. Such corrosion damage will accumulate over time to such an extent that these anchors are no longer capable of performing their intended purpose of holding the protection systems.

OBJECTS OF THE INVENTION

In view of the foregoing it is the aim of the invention to achieve the following objects singly or in combination:

to substantially improve the long term corrosion resistance of such steel cable anchors made of helically wound steel cables;

to achieve the corrosion protection by relatively inexpensive features to be added to the anchor structure; and to protect the corrosion resistant element against mechanical wear and tear by a separate device.

SUMMARY OF THE INVENTION

The invention has achieved the above objects by encasing the looped steel cable end with a tubular member made of synthetic material to provide the desired corrosion protection of the steel cable end and of the eyelet and by protecting the synthetic material tubular member against mechanical wear and tear by a tubular metal jacket that encloses the steel cable and the tubular member at least along the eyelet while the synthetic material tubular member extends along the transition area between the eyelet and the ground and also into the ground to an extent sufficient for achieving the corrosion protection. The tubular metal jacket is shaped in accordance with the desired eyelet configuration.

The just described features according to the invention substantially improve the long term corrosion resistance of such steel cable anchors made of helically wound individual wire strands. The synthetic material tubular member protects the steel cable end against the above mentioned adverse influences, including weather influences while the metallic tubular jacket protects the synthetic material of the tubular member against friction motions of the netting that is secured to the eyelet. Thus, corrosion protection and wear protection are obtained separately.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
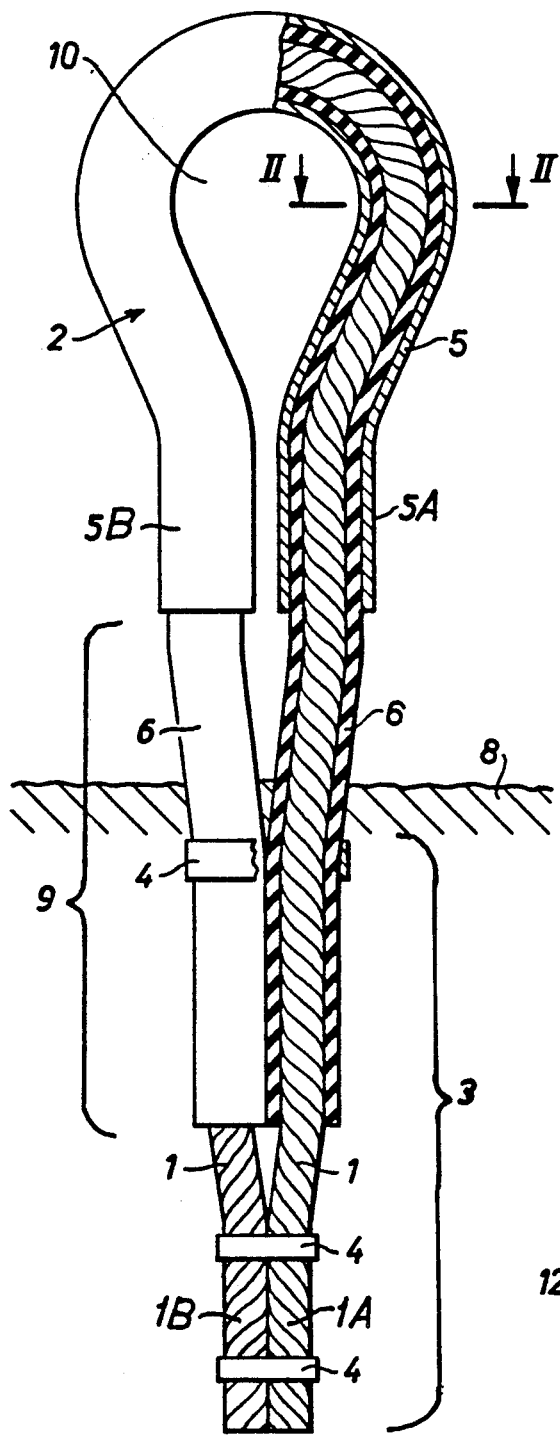
FIG. 1 shows, partially in section, an eyelet construction of a spirally wound steel cable anchor.

As shown in FIG. 1, the steel cable anchor according to the invention comprises a steel cable 1 formed into a loop 2 extending above the ground and into an anchoring section 3 cemented into the ground 8. The cable section 3 includes two approximately straight cable portions 1A and 1B extending approximately in parallel to each other and connected to each other by conventional clamps 4. The cable is formed of helically wound wire strands 7 shown in FIG. 2.

According to the invention, the cable portion forming the loop 2 and a further cable portion 9 are encased by a tubular member 6 of synthetic material, such as polyethylene or similar materials. The tubular member 6 extends along the eyelet 2 and along the section 9 which extends into the ground 8. Further, a tubular metal jacket 5 encloses the tubular member 6 and thus also the steel cable at least along the eyelet for protection against mechanical wear and tear.

It is an advantage of the invention that the tubular metal jacket 5 does not have to extend into the ground 8 so that its exposure to corrosion is reduced. On the other hand, the corrosion protection tubular member 6 of synthetic material bridges the spacing between the jacket 5 and the ground and also extends substantially into the ground to provide the required corrosion protection.

Figure 2:
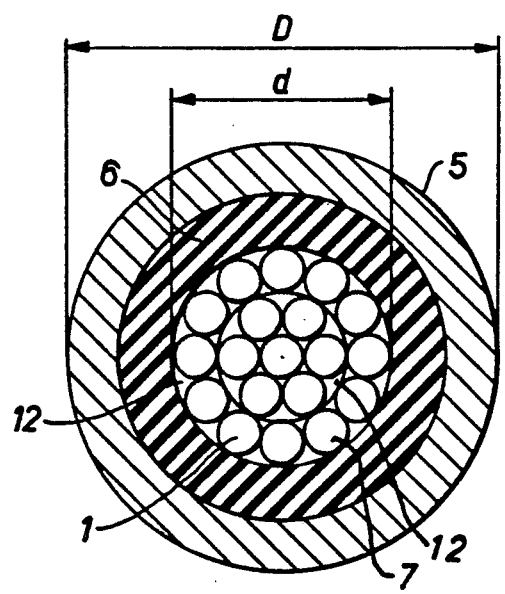
FIG. 2 is a sectional view along section line II—II in FIG. 1.

In order to prevent condensation moisture and air from entering into the cable, the tubular member 6 is provided with a corrosion protection mass 12 that fills the interstices 12 between the inner surface of the tubular member 6 and the individual strands 7 of the cable 1 as best seen in FIG. 2. Such corrosion protection mass may be a mastic material, such as lubricating grease or a zinc dust mastic.

As shown in FIG. 1, the tubular metal jacket 5 is bent into the shape of the eyelet 2. Preferably, the jacket 5 has also two straight portions 5A and 5B next to the loop portion. The diameter of the loop opening 10 is selected in accordance with the coupling devices that secure a protection netting to the loop 2. In any event, the connecting devices are in contact only with the metal jacket 5 and not with the synthetic material tubular jacket 6. Thus, any friction that causes mechanical wear and tear is taken up by the metal jacket 5 and not directly by the tubular member 6. The metal jacket 5 is, for example, made of a zinc coated, galvanized, or otherwise protected steel pipe. The steel pipe may even be made of stainless steel. Tubular member 6 may also be made of steel or aluminium.

Since the mechanical protection is provided by steel jacket 5, and the corrosion protection is provided by the tubular member 6, the wall thickness of the tubular member 6 is not too critical. It may be relatively thick-walled or it may be relatively thin-walled so that a hose-type tubular member can satisfy the present corrosion protection requirements. However, it has been found to be practical that the metal jacket 5 and the synthetic material tubular member 6 have approximately the same wall thickness are shown in FIG. 2. Further, the outer diameter D should be approximately twice the diameter d of wire cable 1, also as shown in FIG. 2.

Although the invention has been described with reference to specific example embodiments, it will be appreciated that it is intended to cover all modifications and equivalents within the scope of the appended claims.

What we claim is:

1. A steel cable and eyelet construction for anchoring in the ground a protection system against falling rocks and avalanches, comprising a first steel cable length sufficient for anchoring said first cable length in a bore in the ground, a second steel cable length to protrude above the ground, and a cable eyelet formed by said second steel cable length, a first corrosion protection comprising a synthetic material tubular member (6) enclosing said cable eyelet, said second steel cable length and at least a part of said first steel cable length intended to extend into the ground, and a second mechanical protection comprising a tubular metal jacket (5) enclosing said synthetic material tubular member (6) on its outside along said cable eyelet and along a part of said second steel cable length intended to protrude above ground, said metal jacket (5) being spaced from said first steel cable length intended to reach into said bore in the ground, whereby a portion of said second steel cable length is free of said metal jacket but corrosion protected by said synthetic material tubular member so that said second steel cable length remains flexible above ground at least along said portion.

2. The steel cable and eyelet construction of claim 1, further comprising a corrosion protection mass in said synthetic material tubular member, said corrosion protection mass filling interstices between an inner wall of said synthetic material tubular member and said steel cable.

3. The steel cable and eyelet construction of claim 2, wherein said corrosion protection mass also fills interstices in said steel cable.

4. The steel cable and eyelet construction of claim 2, wherein said corrosion protection mass in any one of silicone, zinc dust mastic, resin, and lubricating grease.

5. The steel cable and eyelet construction of claim 1, wherein said synthetic material tubular member and said tubular metal jacket have approximately the same wall thickness.

6. The steel cable and eyelet construction of claim 1, wherein said second cable length covered by said synthetic material tubular member and by said metal jacket has an outer diameter (D) which is approximately twice a steel cable diameter (d) inside said synthetic material tubular member and inside said metal jacket.

* * * * *